R. G. HAMILTON.
EVAPORATING PAN.
APPLICATION FILED JUNE 9, 1911.
1,014,468.
Patented Jan. 9, 1912.
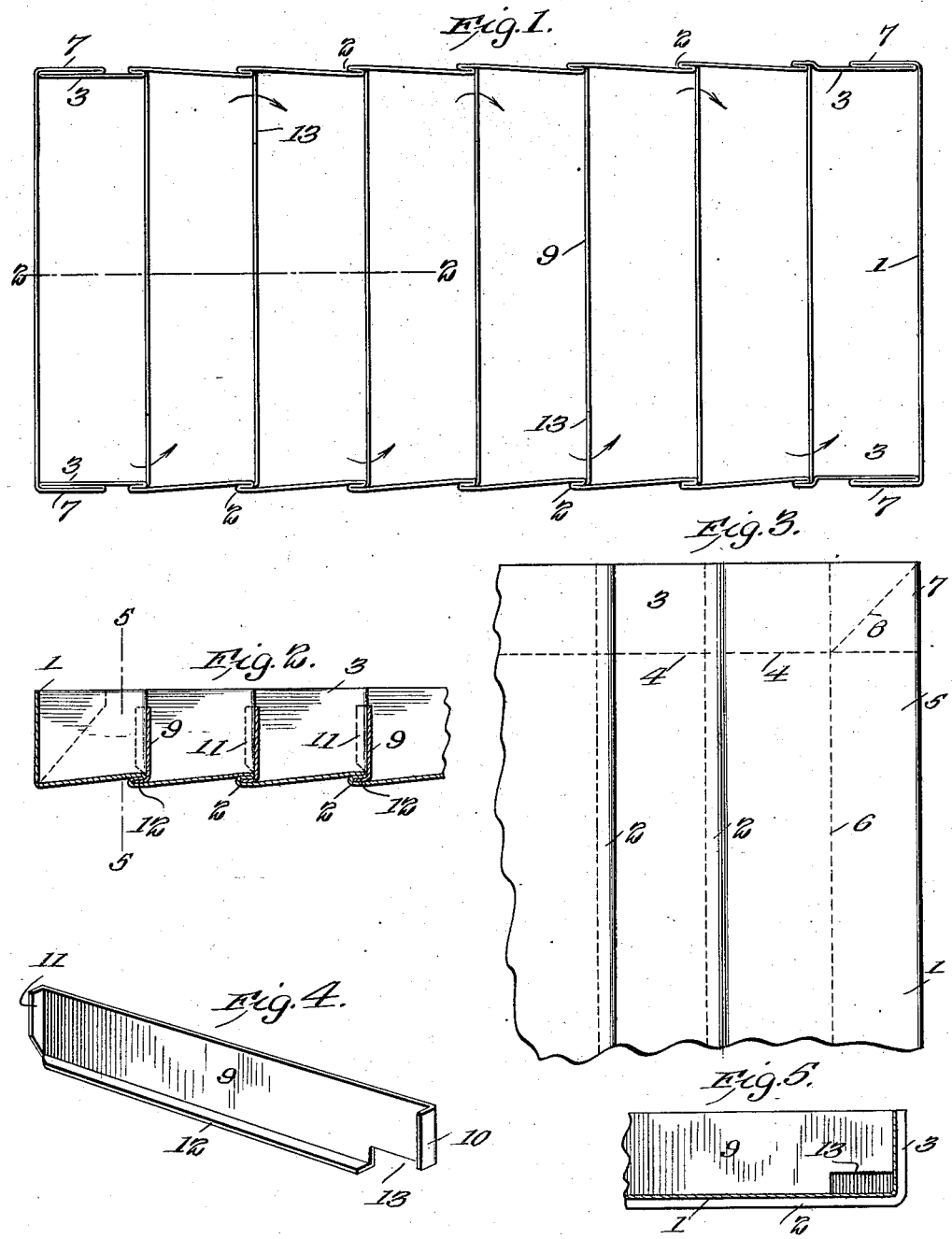
WITNESSES
E. M. Callaghan
L. A. Stanley
INVENTOR
ROBERT G. HAMILTON
BY Munn & Co.
ATTORNEYS

UNITED STATES PATENT OFFICE.

ROBERT G. HAMILTON, OF TRYON, NORTH CAROLINA.

EVAPORATING-PAN.

1,014,468.  Specification of Letters Patent.  Patented Jan. 9, 1912.

Application filed June 9, 1911. Serial No. 632,181.

*To all whom it may concern:*

Be it known that I, ROBERT G. HAMILTON, a citizen of the United States, and a resident of Tryon, in the county of Polk and State of North Carolina, have made certain new and useful Improvements in Evaporating-Pans, of which the following is a specification.

My invention relates to improvements in evaporating pans, and it consists in the combinations, constructions, and arrangements herein described and claimed.

An object of my invention is to provide a device in which there is a series of baffles for causing the flow of the liquid to be evaporated from one side to the other of the pan, the baffles being held in place securely, but without the use of solder, rivets or nails.

A further object of my invention is to provide an evaporating pan which has no seams, and which when enameled will therefore not be liable to leak.

Other objects and advantages will appear in the following specification and the novel features of the device will be particularly pointed out in the appended claims.

My invention is illustrated in the accompanying drawings forming part of this application in which similar reference characters indicate like parts in the several views, and in which—

Figure 1 is a plan view of the device, Fig. 2 is a section along the line 2—2 of Fig. 1, Fig. 3 is a view of a portion of the metal plate which forms the body of the pan before the sides and ends have been turned up, Fig. 4 is a perspective view of one of the partitions or baffles, and Fig. 5 is a section along the line 5—5 of Fig. 2.

In carrying out my invention, I make use of a single sheet of metal 1 which forms the bottom, sides and end of the tank or pan proper. This sheet is crimped transversely as shown at 2 in Fig. 3, the crimped portion being bent back upon itself and then reversed as shown in Fig. 2. The side portions 3 are then bent upwardly along the line 4 (see Fig. 3) and the end portion 5 is bent upwardly along the line 6, the screw 7 being bent along the line 8, and being pressed closely against the side as shown in Fig. 1. The construction thus far described makes a pan of the general shape shown in Fig. 1 in which the crimped portions 2 extend upwardly on the sides of the pan.

The partitions or baffles are made in the shape shown in Fig. 4. They each consist of a body portion 9 having a laterally turned flange 10 at one end, and a flange 11 at the other. A bottom flange 12 is also provided. One end of the body portion 9 and of the flanges 10 and 12 is cut away as shown at 13 to provide an opening for the liquid. The end flanges 10 and 11 are inserted between the crimped portions of the sides 3, while the flange 12 is inserted between the crimped portions of the bottom 1 in the manner clearly shown in Fig. 2. These crimped portions are then pressed closely together. It will be observed that the partitions or baffles 9 do not extend to the top of the pan, but are sufficiently high to cause the liquid to take the circuitous course indicated by the arrows in Fig. 1. To this end the adjacent baffles have their openings 13 at opposite ends.

In the use of the device the pan is slightly inclined, so as to cause the liquid at one end to run to the other. In order to do so it has to pass back and forth along the baffles 9 so that the movement of the liquid in the shallow pan aids in the evaporation thereof.

The construction of the pan in the manner described enables it to be enameled, and since there are no seams there is no danger of one part withdrawing from another and thereby permitting the pan to leak. Moreover, there are no rivet holes or nail holes, since the baffles are held securely in the crimped portions of the main plate.

I claim:—

1. In an evaporating pan, a main body portion constructed of a single piece of sheet metal, said sheet of metal being crimped, and a series of baffles having portions arranged to be held by the crimps in said body portion.

2. In an evaporating pan, a main body portion constructed of a single piece of sheet metal, said sheet of metal having a series of parallel crimps, and a series of parallel baffles held by the crimps in said body portion.

3. In an evaporating pan, a main body portion constructed of a single piece of sheet metal, said sheet of metal having a series of parallel crimps, and a series of parallel baffles having laterally extending flanges at their bottoms and ends, said flanges being held by the crimps in said body portion.

4. In an evaporating pan, a main body portion constructed of a single piece of sheet metal, said sheet of metal having a series of parallel crimps in its bottom and sides, a plurality of baffles, the baffles comprising a main body portion having flanges at each end and at its bottom arranged to be engaged and held by the crimps in said main body portion, and adjacent baffles being provided with openings at the opposite ends thereof.

ROBERT G. HAMILTON.

Witnesses:
E. B. CLOUD,
W. E. HILL.

Copies of this patent may be obtained for five cents each, by addressing the "Commissioner of Patents, Washington, D. C."